Dec. 1, 1931.                    R. C. OSGOOD                    1,834,598
                                    HOIST
                             Filed Aug. 5, 1929.
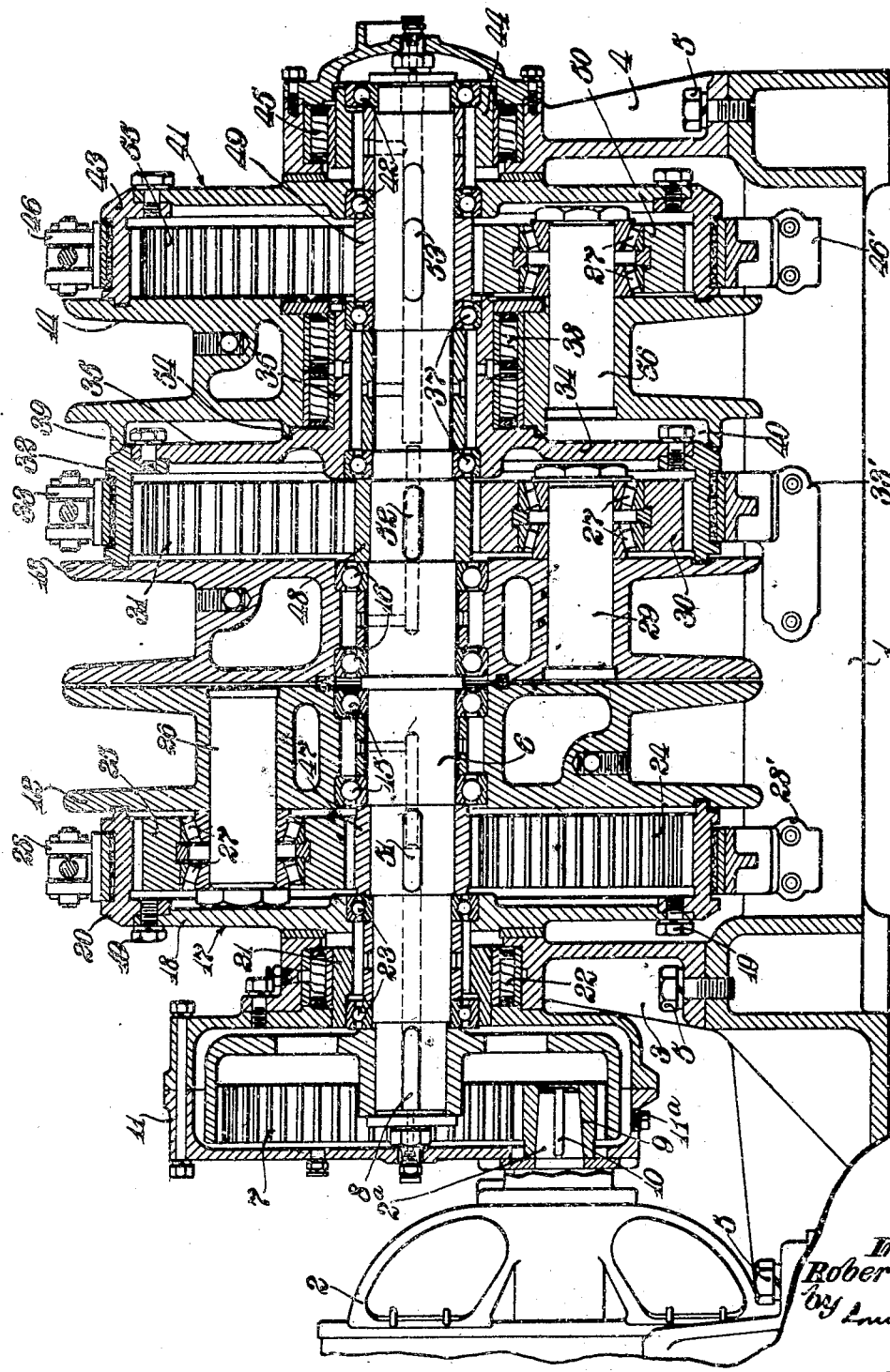

Patented Dec. 1, 1931

1,834,598

UNITED STATES PATENT OFFICE

ROBERT C. OSGOOD, OF CLAREMONT, NEW HAMPSHIRE, ASSIGNOR TO SULLIVAN MACHINERY COMPANY, A CORPORATION OF MASSACHUSETTS

HOIST

Application filed August 5, 1929. Serial No. 383,599.

This invention relates to hoists, and more particularly to a hoisting mechanism providing a plurality of winding drums. A hoisting mechanism made in accordance with my invention may very advantageously be used in a so-called slusher system of handling ore.

One object of my invention is to provide an improved hoist with a plurality of winding drums. More specifically, the object of my invention is to provide an improved hoisting mechanism having three or more winding drums driven from a common power shaft. These and other objects of this invention will, however, be more evident in view of the following description and claims.

In the accompanying drawing I have shown for purposes of illustration one form which my invention may assume in practice.

In the drawing,—

The figure is a central longitudinal vertical sectional view through the illustrative embodiment of the improved hoist, a fragment of the driving motor being shown in elevation.

This invention is a development of the mechanism disclosed in my patent, No. 1,740,707, patented Dec. 24, 1929.

In the illustrative construction shown in the drawing, a motor 2 and a pair of standards 3 and 4 are secured upon a base 1 by screws 5. A main driving shaft 6 extends between the standards 3 and 4; and is driven by an internal gear 7 which is keyed at 8 to its left end. A motor pinion 9 keyed at 10 to the motor shaft 2ª meshes with the gear 7 to drive the shaft 6. A gear housing 11 surrounds the aforementioned gearing and provides a chamber for holding a supply of lubricant that may be drained on removal of the plug 11ª.

The three drums 12, 13 and 14 are supported by the shaft 6 and are arranged in the order named from left to right on said shaft. A pair of ball bearings 15 are interposed between the shaft 6 and the drum 12, and a pair of ball bearings 16 between the shaft 6 and the drum 13. A reaction member 17 is mounted on the shaft 6 adjacent the standard 3, and includes a disc 18 to which is secured by bolts 19 an annular flange member 20. A hub 21 is formed integral with the disc 18, and is journaled in the standard 3 by means of roller bearings 22. Ball bearings 23 are interposed between the shaft 6 and the hub 21 to provide for relative rotation between the same.

Gear teeth 24 are formed on the inside of the flange member 20; and a drum driver pinion 25 meshes with the teeth 24. This pinion is carried on a stub shaft 26 mounted in the drum 12, thrust bearings 27 being provided between the shaft 26 and the pinion 25, and pinion 25 meshes both with the teeth 24 and with a pinion 47 keyed at 51 to the shaft 6. Brake mechanism 28 cooperates with a groove formed on the outside of the flange member 20; and is anchored to the base 1 by being detachably fastened to a bracket 28' carried by the base.

The intermediate drum 13 is similarly provided with a stub shaft 29 on which is rotatably mounted a drum driver pinion 30. This pinion meshes with gear teeth 31 formed on the inside of a flange member 32 similar to the flange member 20 and with a pinion 48 keyed at 52 to the shaft 6. A brake mechanism 33, similar to the brake mechanism 28, cooperates with a groove formed on the outside of the flange member 32; and is anchored to the base 1 by being detachably fastened to a bracket 33' carried by the base. The flange member 32 is secured to a reaction member 34, similar to the reaction member 18 in that it comprises a disc 35 with which is integrally formed a hub 36. Ball bearings 37 are interposed between the shaft 6 and the hub 36 to provide for relative rotation between these two members. The mechanism thus far described is, in principle, substantially like the mechanism disclosed in my above mentioned copending application.

The additional drum 14 is not journaled directly on the shaft 6 but is supported by roller bearings 38 on the hub 36 of the reaction member 35. Drum 14 is provided on its left outer face with an annular flange 39 which slightly overlaps the flange member 32 so as to seal the space 40 between the drum 14 and the reaction member 35. This hinders the entrance of any grit or other material to the roller bearings 38. An additional inner flange 54 on the drum 14 cooperates with a rabbeted corner on the hub 36 to further protect the roller bearings 38. A reaction member 41, similar to the reaction member 17 is provided to the right of the drum 14 and is rotatably mounted in the standard 4 on roller bearings 45. This reaction member comprises a flange member 43 and a hub 44; and ball bearings 42 are interposed between the hub 44 and the shaft 6 to support the latter. A brake mechanism 46, similar to the other brake mechanisms 28 and 33 cooperates with the groove formed on the outside of the flange member 43, and is detachably fastened to a bracket 46' carried by the base.

Gear teeth 55 are formed on the inside of the flange member 43; and a drum driver pinion 50 meshes with the teeth 55. This pinion is carried on a stub shaft 56 mounted in the drum 14; and meshes both with the teeth 55 and with a pinion 49 keyed at 53 to the shaft 6.

In view of the above detailed description of this hoisting mechanism, the operation of the same will be apparent. The motor, whenever it is running, drives the main shaft 6 continuously. This shaft through the means of pinions 47, 48 and 49 drives the drum driver pinions 25, 30 and 50 respectively. Since the reaction members 18, 35 and 41 are rotatably mounted, there are two possibilities. If the cooperating brake mechanism is loose, so that the reaction member is free to rotate, there will be no positive drive of the corresponding drum: the drum driver pinions merely act as intermediate gears, and the driving effect is transmitted from the pinions 47, 48 and 49 to the respective reaction members. Should one or more of the brake mechanisms 28, 33 or 46 be applied, the respective drum 12, 13 or 14 will be positively driven; and the respective drum driver pinion will roll around inside of the respective flange member, carrying the drum with it.

As a result of this invention it will be noted that I have provided an improved hoisting mechanism having a plurality of drums, and as a further advantage, it will be noted that each drum may be independently driven; and furthermore that rope may be paid out independently from any of the drums, while one or more of the remainder is being driven.

While I have in this application specifically described one form which the invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. In a hoisting mechanism, spaced supports, a power shaft rotatably mounted therein, a winding drum rotatably mounted on said shaft, operative driving connections between said shaft and said drum including a member surrounding said shaft and provided with a hub, a winding drum rotatably mounted on said hub, and independent operative driving connections between said shaft and said latter drum.

2. In a hoisting mechanism, spaced supports, a power shaft rotatably mounted therein, a winding drum rotatably mounted on said shaft, planetary gearing connecting said shaft and said drum in driving relation including a pinion adjacent said drum on said shaft, a planet gear meshing with said pinion, and a control member with which said planet gear cooperates rotatably mounted on said shaft and provided with a hub, another winding drum rotatably mounted on said hub for rotation relative thereto, and operative driving connections between said shaft and said latter drum.

3. A hoisting mechanism comprising spaced supports, a power shaft rotatably mounted therein, a plurality of winding drums rotatably mounted on said shaft including an intermediate drum, operative driving connections between said intermediate drum and said shaft including a member surrounding said shaft adjacent the outer end of said intermediate drum and provided with an outwardly projecting hub, another of said winding drums being rotatably mounted on said hub for rotation relative thereto, and operative driving connections between said shaft and said latter drum.

4. In a hoisting mechanism, spaced supports, a power shaft rotatably mounted therein, a winding drum rotatably mounted on said shaft, reduction gearing connecting said drum and said shaft in driving relation including a pinion on said shaft adjacent said drum and a gear provided with a hub rotatably mounted on said shaft adjacent said pinion, a winding drum rotatably mounted on said hub, and independent operative driving connections between said shaft and said latter drum.

5. A hoisting mechanism comprising a power shaft, means for supporting the same, winding drums rotatably mounted on said shaft, planetary gearing connecting said shaft in driving relation with one of said drums comprising a sun gear on said shaft, a planet gear carried by said drum and a reaction gear provided with a hub rotatably mounted on said shaft, a winding drum rotatably mounted on said hub, for rotation relative thereto, and operative driving connections between said shaft and said latter drum.

6. A hoisting mechanism comprising spaced supports, a power shaft rotatably mounted therein, a plurality of winding drums rotatably mounted on said shaft, operative driving connections between one of said drums and said shaft including a member surrounding said shaft adjacent the outer end of said drum and provided with an outwardly projecting hub, another winding drum rotatably mounted on said hub for rotation relative thereto, and separate operative driving connections between said shaft and said latter drum.

7. In a hoisting mechanism, spaced supports, a power shaft rotatably mounted therein, three rotatably mounted winding drums supported by said shaft, and independent planetary driving connections between each of said drums and said shaft each having control means permitting individual control of its respective drum and one of said planetary driving connections having a hub acting as a bearing for another of said drums.

8. In a hoisting mechanism, spaced supports, a power shaft rotatably mounted therein, three rotatably mounted winding drums supported by said shaft, and independent planetary driving connections between each of said drums and said shaft each having control means permitting individual control of its respective drum, the driving connections with one of said drums including a gear element journaled on said shaft and providing a bearing for another of said drums.

9. In a hoisting mechanism, spaced supports, a power shaft rotatably mounted therein, relatively rotatable winding drums supported by said shaft, and independent power transmitting driving connections between said shaft and said drums, the driving connections for each drum including a reaction member releasable or stationary at will, and one of said reaction members providing a bearing for a drum of whose driving connections it forms no part.

In testimony whereof I affix my signature.

ROBERT C. OSGOOD.